Figure 4:
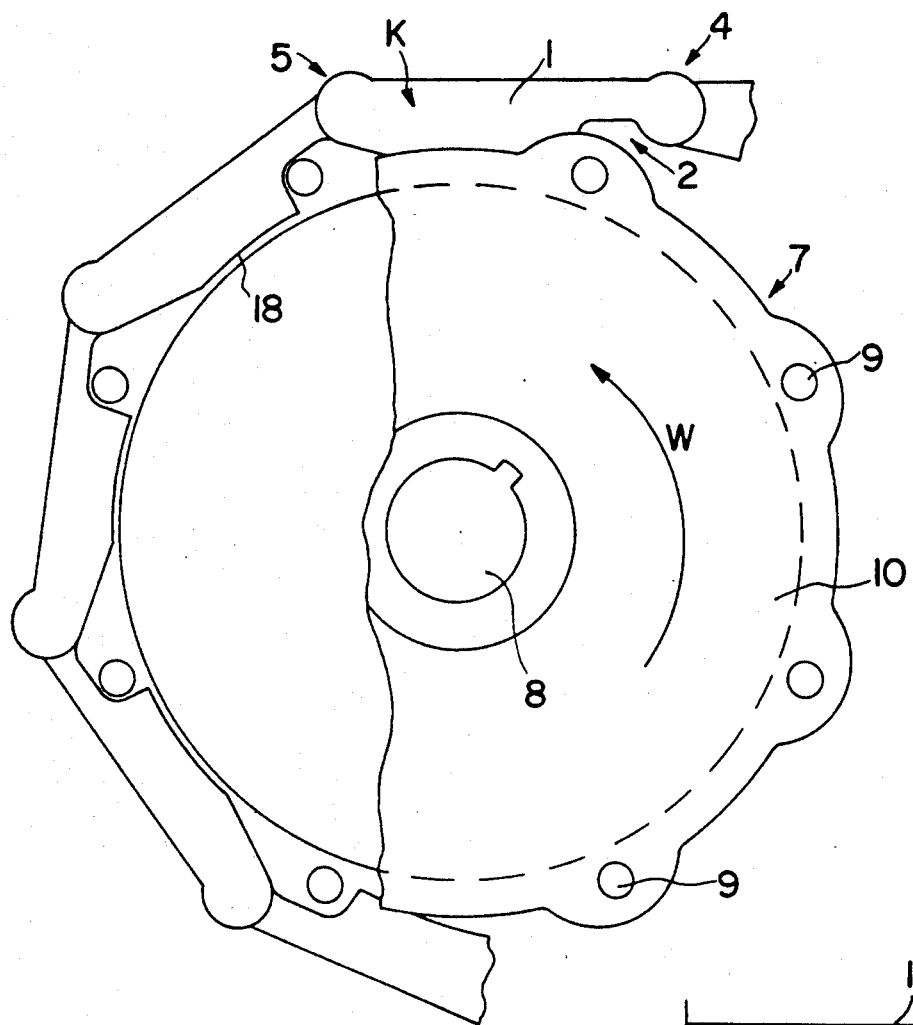

United States Patent [19]

Tuomikoski

[11] Patent Number: 5,192,251

[45] Date of Patent: Mar. 9, 1993

[54] TRANSMISSION CHAIN STRUCTURE
[75] Inventor: Pekka Tuomikoski, Rauma, Finland
[73] Assignee: Ketjumyynti Tumikoski Ky, Finland
[21] Appl. No.: 770,452
[22] Filed: Oct. 3, 1991
[30] Foreign Application Priority Data Oct. 3, 1990 [FI] Finland ................................ 904864

[51] Int. Cl.[5] ............................................. F16H 7/02
[52] U.S. Cl. .................................... 474/206; 474/232
[58] Field of Search ........ 474/206, 212, 210, 232-234; 59/84, 85, 88, 95

[56] References Cited

U.S. PATENT DOCUMENTS 4,123,947 11/1978 Smith et al.
4,645,476 2/1987 King et al. ....................... 474/206 X
4,815,270 3/1989 Lapeyre ........................... 474/232 X

FOREIGN PATENT DOCUMENTS 64707 8/1983 Finland .

Primary Examiner—Thuy M. Bui
Attorney, Agent, or Firm—Pollock, Vande Sande & Priddy

[57] ABSTRACT

The invention relates to chain structure comprising several form pieces (1) and a wheel arrangement comprising at least one drive wheel (7) for transferring the chain, which is formed of said form pieces (1). The bearing surface (1B) of each form piece (1) consists of at least one transverse opening (2) which is arranged to be situated near one of the articulations (4, 5), which opening consists of the contact edge, the bottom and the back edge. When the chain is in mesh said openings (2) of the chain co-operate with the transverse joint pins (9) belonging to said drive wheels (7). The free length of the joint pins (9) essentially correspond to the width of the form pieces (1), whereupon the contact area formed during the contact situation in said mesh of said pins (9) and the openings (2) essentially corresponds in length to the width of the form pieces (1). After said contact situation said pin (9) leaves the opening (2) of the chain from that end thereof which is on the side of the trailing edge. In said contact situation and seen from a direction perpendicular to the largest axial cross-sectional area of pin (9), the free area of said opening (2) is essentially larger than the cross-sectional area of the corresponding pin (9), whereupon said contact area is formed on that part of the contact edge of the opening (2) on the bearing surface (1B) which joins said bottom. Furthermore, the largest distance of said contact edge from the center line (K), which goes through the centers of the holes at the ends of the form piece (12), is essentially larger than the corresponding distance of said trailing edge from said center line (K).

16 Claims, 2 Drawing Sheets

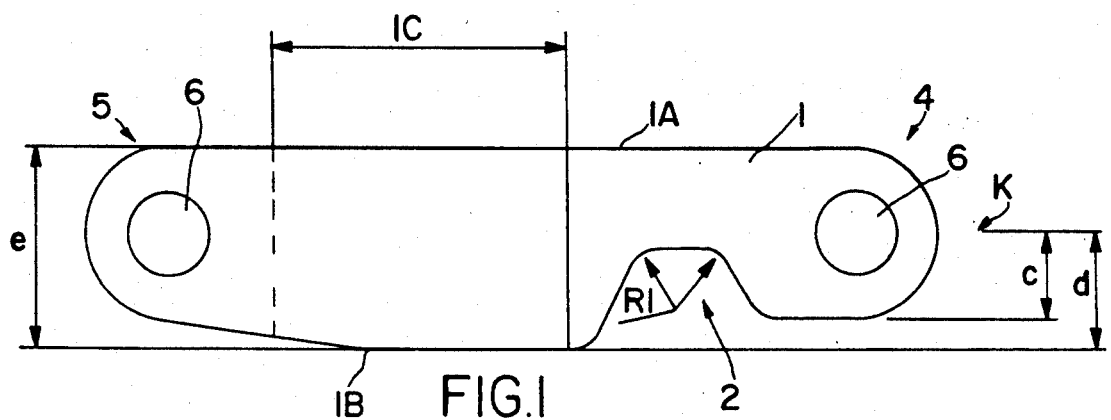
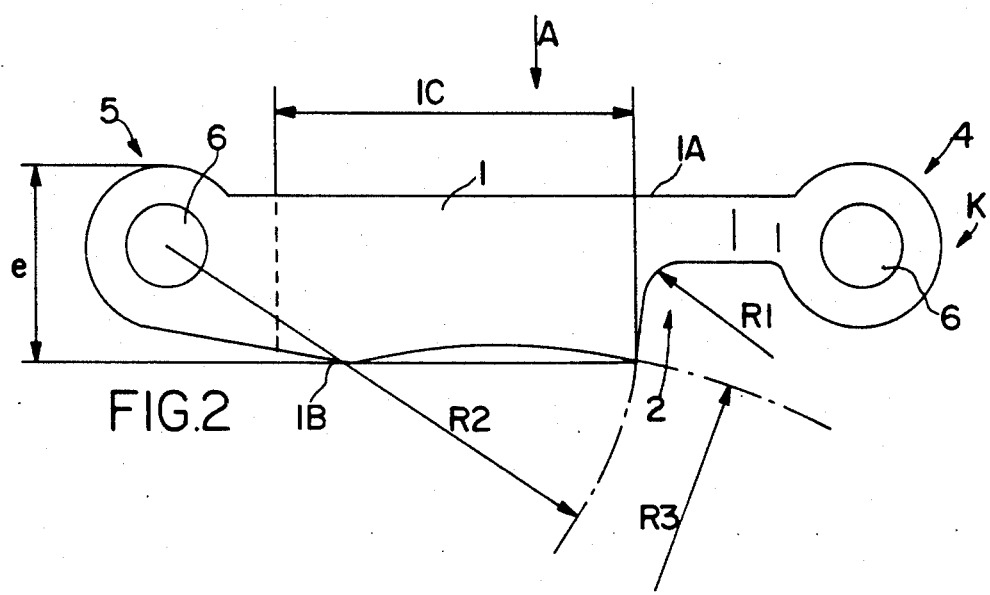
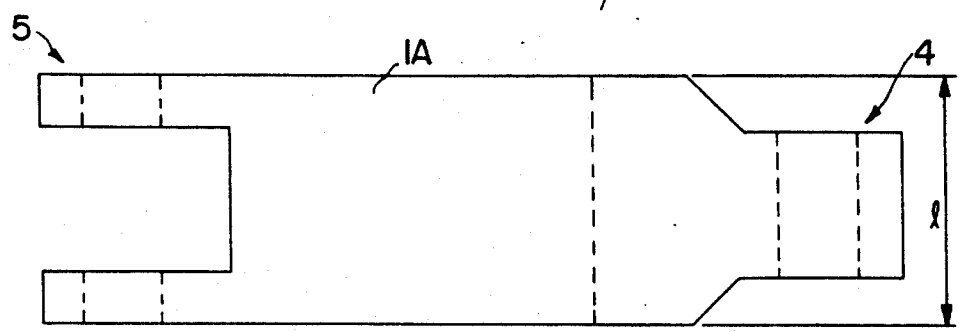

TRANSMISSION CHAIN STRUCTURE

The invention relates to a transmission chain structure comprising several form pieces linked together by means of articulation means like joint pins or corresponding and a wheel arrangement comprising at least one drive wheel or a corresponding means for transferring the chain, which is formed of said form pieces linked together by means of articulation means. The bearing surface of each form piece consists of at least one opening which is transverse relative to the direction of motion of said chain and which is eccentrically arranged relative to the articulation pitch near one of the articulations, which opening consists of the contact edge, the bottom and the back edge. For moving said chain i.e. when the chain is in mesh, said openings of said form pieces of said chain, co-operate with the joint pins or corresponding belonging to said drive wheels or corresponding means, the joint pins being transverse relative to the direction of motion of said chain and fitted in accordance with the openings and the free length of the joint pins essentially corresponding to the width of the form pieces. The contact area formed during the contact situation in said mesh of said pins or corresponding means and the openings essentially corresponds in length to the width of the form pieces whereby, after said contact situation, said pin leaves the opening of the chain from that end thereof which is on the side of the trailing edge.

A chain structure of the above type is previously known from the publication FI-64707, where the presented form piece comprises an opening which is perpendicular to the direction of motion and whose length corresponds to the width of the form piece and which is most preferably placed near the second articulation of said form piece. Then as the chain angles and the gear opening engages the sprocket or corresponding of the drive wheel, a lever arm is formed and the force acting on the chain presses said openings firmly against the sprocket or corresponding thus preventing so-called jumping-over. Furthermore, due to the lever arms the chain structure readily detaches from the sprocket on the return side of the drive wheel preventing so-called carrying-along.

The publication U.S. Pat. No. 4,123,947 presents a so-called conventional chain structure, which is made of a nonmetallic material. Power transmission of this chain structure between the drive wheel and said chain generally takes place by means of a drive wheel or corresponding having sprockets of standardized form.

The chain structure of the publication FI-64707 has in practice turned out to be reliable. However, in some specific chain structures used for instance in water purification plants or corresponding, switching to plastic or corresponding non-metallic materials has become necessary due to corrosion and need to decrease density. Then, in specific applications, said jumping-over over has been observed as a result of high loads and the greater flexibility of plastics or corresponding materials compared to steel. Consequently, due to small strain, vibration or a corresponding reason the chain on the driving wheel will be able to move out of the sprockets of the driving wheel so that the driving wheel starts rotating while the sprockets freely slide along the outer surface of the chain. In this case, to reestablish the original power transmission between the chain and the drive wheel, rotation of the drive wheel is halted and the chain is remounted on it. Direct and indirect damages due to this kind of jumping-over can be very significant causing service, maintenance etc. measures.

In the traditional chain structure presented in the publication U.S. Pat. No. 4,123,947, the cooperation between the chain structure and the drive wheel used therewith is based, in the most advantageous case, on the application of a so-called involute curve which is a standard concerning the sprockets. In principle, the sprockets of the chain structure presented in the US publication correspond, as to their basic profile, to the basic profile formed by the opening body of the form piece presented in the FI publication.

In practice, the chain structure of the FI publication is a more advantageous solution compared to said US publication because of the lever arms contained therein. However, it is not possible to prevent said jumping-over in either solution by increasing the depth of the basic profile because this would lead to the situation where the chain cannot detach from the engagement of the sprockets or the pins or corresponding on the exit side of the drive wheel. In order to obtain smooth contact said involute surfaces must be accurately designed and machined.

The objective of this transmission chain structure is to obtain an essential improvement to the above drawbacks and thereby to upgrade the prior art in the field. For obtaining this objective, the transmission chain structure is mainly characterized in that, during said contact situation and seen from a direction perpendicular to the largest axial cross-sectional area of said pin, the free area of said opening is essentially larger than the cross-sectional area of the corresponding pin, whereupon said contact area is formed on that part of the contact edge of the opening on said bearing surface which joins said bottom, and that the largest distance of said contact edge from the centre line, which goes through the centres of the holes of said articulations at the ends of the form piece, is essentially larger than the corresponding distance (c) of said trailing edge from said centre line.

Simplicity and reliability can be mentioned as the most important benefit of the chain transmission structure according to the invention due to the fact that the height of the contact edge of the form piece of the invention can be defined according to the applications and essentially to a sharper angle than in the socalled involute profile. For the above reasons, the transmission structure according to the invention essentially eliminates jumping-over of the chain on the drive wheel caused by a higher load acting on said chain in one direction.

According to one beneficial embodiment to form the chain in a way that is known in itself, each form piece comprises two articulations, which are provided with holes having essentially an equal size and a corresponding ross-sectional area as said articulation means, one of the articulations being arranged to form a solid extension preferably being narrower in width than the form piece the other one being arranged to form a fork. Then for forming the chain, the articulation is formed inserting said extension of the preceding form piece between said fork of the next form piece and inserting said articulation means like a joint pin or corresponding in said holes. According to this invention, said trailing edge of the opening in the chain is so arranged that it is formed of the outer surface, being situated closest to the trailing edge and having preferably a circular cross-section, or part of said outer surface of said articulation which comes next after in the direction of the motion of the chain.

According to one beneficial embodiment said articulation is formed of a bushing arrangement so that the bushing arrangement functions at least partly as said trailing edge, whereupon said bottom joins the outer surface of the bushing arrangement which outer surface is situated on the side of the opening and preferably has a cylindrical form.

According to one beneficial embodiment said back edge in the opening of said form piece is positioned into connection with said solid extension and that it forms at least part of the trailing edge.

According to one beneficial embodiment the bearing surface of said form piece is arranged concave at least in the direction of said centre line, most preferably so that it corresponds to the functional radius of curvature of said wheel arrangement like a drive wheel or corresponding.

According to one beneficial embodiment, part of the contact edge that joins the bottom is arranged essentially to correspond to the external shape of the pin which during said contact situation provides the transmission contact therewith, and/or, said contact edge is arranged to be convex within the part that joins said bearing surface whereupon the centre of curvature of said part is essentially the centre of the hole of said closest articulation which precedes said part in the direction of the motion, and/or, said bottom is arranged to be essentially parallel with said centre line in the direction of motion of the chain.

Figure 5:
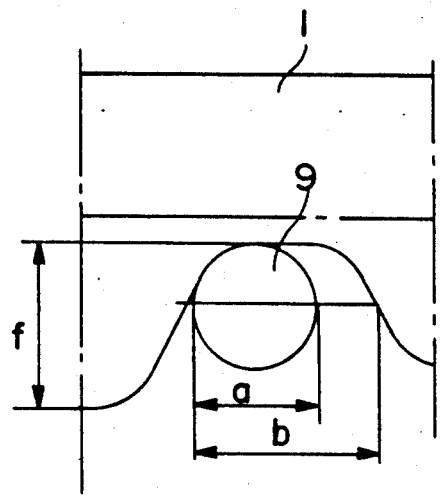

In the following description, the invention will be described in detail referring to the enclosed drawings in which FIG. 1 shows a side view of a form piece used in one embodiment of the invention, FIG. 2 shows an alternative form piece according to one embodiment of the invention, FIG. 3 shows the form piece of FIG. 2 seen along the direction A, FIG. 4 shows the chain structure composed of the form pieces of FIG. 2 and the corresponding drive wheel and FIG. 5 shows a detail for clarifying the definition of the opening in the form piece.

The form piece shown in FIG. 1 comprises a transverse opening 2 with a length corresponding to the width of the form piece 1. Opening 2 is shaped so that, during working contact situation, the free area of opening 2, seen along the direction that is perpendicular to the largest cross-section in axial direction of the pin providing transmission contact with the opening, is essentially larger than the cross-sectional area of the corresponding pin or according to the detail presented in FIG. 5: b ×1> a ×1. Although opening 2 can in principle be situated at any point on the bearing surface 1B of the form piece 1, it is most advantageously situated near the second articulation 4 according to FIG. 1. In that case, a lever arm is formed as the chain composed of said form pieces 1 angles and as opening 2 contacts with the pin or corresponding of the drive wheel and therefore the force acting on the chain presses openings 2 firmly against the pins or corresponding of the drive wheel.

Opening 2 consists of the contact edge, bottom and back edge. Due to the design of opening 2, the contact area of opening 2 during working contact situation is composed of the part which is situated on the bearing surface 1B of the contact edge of opening 2 and which joins said bottom. Curvatures of the contact edge and the back edge of opening 2 are formed according to the normal involute profile, its bottom is arranged in the direction of motion of the chain to be essentially parallel with the centre line K which goes through the centre points of holes 6, being situated essentially at the ends of the form piece 1 and its back edge is arranged into connection with articulation 4 comprising said solid extension. Then the parts of the bottom joining the contact edge and back edge are designed to correspond to the diameter of the pin of the drive wheel. Furthermore, the longest distance d of the contact edge of opening 2 from the centre line K is essentially longer than the corresponding distance c of said back edge from said centre line K.

The total height e of form piece 1 has its greatest value at the bearing surface 1B, which is achieved by increasing the height of said form piece 1 starting from the end of the articulation 5. Part 1C of the back surface 1A of the form piece can be designed according to the use of the chain structure. Lugs and other fixtures can be formed, during manufacture of the form pieces 1, at this point 1C of the form piece 1 whereon for instance push plates can be mounted. In that case, the push plates or other fixtures can be fixed mechanically on the lugs of the form piece 1 and thus internal thermal stresses due to welds can be avoided. Depending on the need, either metallic or non-metallic raw materials can be used for making the form piece 1.

The form piece of FIG. 2 deviates from the foregoing in that:

The back edge of opening 2 is arranged into connection with articulation 4 comprising said solid extension so that it forms part of the trailing edge of the chain composed of said form pieces, the contact edge of opening 2 is made convex within that part which joins the bearing surface 1B and then the centre of curvature (radius of curvature = R2) of said part is essentially the centre point of hole 6 which is situated at the nearest articulation preceding in the direction of motion of the chain, the preceding articulation 5, the contact edge being essentially at a sharper angle than the contact edge of opening 2 of FIG. 1, the bearing surface 1B is arranged to be partly concave in the direction of said centre line K and its radius of curvature R3 corresponds essentially to the functional radius of curvature of said wheel arrangement like drive wheel or corresponding and the form piece is made narrower within the back surface 1A.

The concave form of the bearing surface 1B allows one to use smooth sheaves for supporting the chain or for changing its direction in the wheel arrangement of chains which are formed of said type of form pieces.

FIG. 3 shows the form piece of FIG. 2 seen along the direction A, showing one advantageous embodiment for shaping articulations 4, 5 of the form piece. One articulation 4 is arranged to form a solid extension which is narrower than the width 1 of the form piece 1 and the other articulation 5 is arranged to form a fork. Then to make up a chain, the articulation is formed by inserting said extension 4 of the preceding form piece between said fork 5 of the following form piece and placing an articulation member like a pin or corresponding in the holes 6.

FIG. 4 shows a side view of the chain which is formed of the form pieces 1 of FIG. 1 and the corresponding drive wheel 7. The drive wheel 7 comprises two parallel side plates 10 which are coaxial with the drive shaft 8 and whose distance from each other in the axial direction essentially corresponds to width of the chain i.e. width 1 of the form piece. Between said side plates 10 there are provided evenly pitched pins 9 which are transverse with respect to the direction of rotation w of the drive wheel 7 and placed at equal radial distance from the centre point of drive shaft 8. The distance between pins 9 corresponds to the distance between openings 2 of form pieces 1 of the chain in successive form pieces 1. The edge area of the side plates 10 of the drive wheel 7 act as a guide for the chain preventing it from moving sideways. The contact area of both the openings 2 and the pins 9, which are round in this embodiment, is large since the contact areas have the same width as the width of the whole chain. In practical applications, pins 9 are generally also provided with bearings allowing rotation around the longitudinal axis by means of suitable slide bearings thus removing the sliding friction between the contact edge of opening 2 and pin 9. Then, a plastic or a corresponding material is quite commonly used for the wear part i.e. as a surface material thus reducing noise.

After the contact situation said pin 9 leaves the drive wheel 7 on the exit side thereof so that, due to straightening of the chain, the distance between successive openings 2 increases and the pin 9 of the drive wheel 7 comes loose from that part, which joins the bottom, of the contact edge of the form piece 1 without touching the back edge of said form piece 1 or the trailing edge in the chain. For this reason, height f (see FIG. 5) or inclination of the contact edge has no essential significance in the loosening of pin 9 from the chain. Then, for transmitting a larger load to the chain essentially in one direction, height f of the contact edge of the opening 2 can be optimized whenever necessary. Nevertheless, the chain can also be used in the direction that is opposite to the direction of its main use but then the load must be essentially smaller than in normal use for avoiding said jumping-over.

It is obvious that the invention is not limited to the above embodiments but it can be considerably varied within the basic idea of the enclosed claims.

I claim:

1. A transmission chain structure comprising several form pieces linked together by means of articulation means and a wheel arrangement including at least one drive wheel or a corresponding means for transferring the chain, which is formed on said form pieces linked together by said articulation means, wherein the bearing surface of each form piece consists of at least one opening which is transverse relative to the direction of motion of said chain and which is eccentrically arranged relative to the articulation pitch near one of the articulations, said opening including the contact edge, the bottom and the back edge, whereupon for moving said chain when the chain is in mesh said openings of said form pieces of said chain cooperate with joint pins of said drive wheels the joint pins being transverse relative to the direction of motion of said chain and being fitted in accordance with the openings and the free length of the joint pins substantially corresponding to the width of the form pieces, the contact area formed during the contact in said mesh of said pins and the openings substantially corresponding in length to the width of the form pieces, whereby, after said contact, said pin leaves the opening of the chain from that end thereof which is on the side of the trailing edge, wherein, during said contact and seen from a direction perpendicular to the largest axial cross-sectional area of said pin, the free area of said opening is substantially larger than the cross-sectional area of the corresponding pin, whereupon said contact area is formed on that part of the contact edge of the opening on said bearing surface which joins said bottom, and wherein the largest distance of said contact edge from the center line, which goes through the centers of the holes of said articulations at the ends of the form piece, is substantially larger than the corresponding distance of said trailing edge from said center line.

2. A transmission chain structure of claim 1 wherein, for forming said chain, each form piece comprises two articulations, which are provided with holes having a substantially equal size and corresponding to the cross-sectional area of said articulation means, one of the articulations being arranged to form a solid extension narrower than the width of the form piece and the other one being arranged to form a fork whereby, for forming the chain, the articulation is formed inserting said extension of the preceding form piece between said fork of the next form piece and inserting said articulation means like joint pin in said holes, wherein said trailing edge of the opening in said chain is so arranged that it is formed of the external surface, preferably circular in cross-section, or part thereof of said articulation which is closest to the trailing edge and which comes next after in the direction of the motion of the chain.

3. A transmission chain structure of claim 1, wherein said bearing surface of said form piece is arranged, at least in the direction of said center line, at least partly concave.

4. A transmission chain structure of claim 3 wherein the radius of concavity of said bearing surface is so arranged that it substantially corresponds to the functional radius of curvature of said wheel arrangement.

5. A transmission chain structure of claim 1 wherein said part of the contact edge that joins the bottom is arranged substantially to correspond to the external shape of the pin which during said contact provides the transmission contact therewith.

6. A transmission chain structure of claim 1, wherein said contact edge is arranged to be convex within the part thereof that joins said bearing surface whereupon the center of curvature of said part is substantially the center of the hole of said closest articulation which precedes said part in the direction of the motion.

7. A transmission chain structure of claim 1, wherein the parts forming the surface of said contact edge are composed of at least the first radius of curvature, whereupon the center of curvature of said part of the contact edge, which joins said bearing surface, is substantially the center of the hole of said articulation which is closest to and precedes said part in the direction of the motion, and the second radius of curvature, whereupon the radius of curvature of that part of the contact edge, which joins said bottom, corresponds substantially to the radius of curvature of the pin which, during said contact, provides the transmission contact therewith.

8. A transmission chain structure of claim 1, wherein in the direction of motion of the chain said bottom is arranged to be substantially parallel to said center line.

9. A transmission chain structure of claim 2 wherein said articulation is formed of a bushing arrangement so that the bushing arrangement functions at least partly as said trailing edge, whereupon said bottom joins the outer surface of the bush arrangement which outer surface is situated on the side of the opening and preferably has a cylindrical form.

10. A transmission chain structure of claim 2 wherein said back edge in the opening of the form piece is arranged into connection with said solid extension and wherein it forms at least part of the trailing edge.

11. A transmission chain structure of claim 2, wherein said bearing surface of said form piece is arranged, at least in the direction of said center line, at least partly concave.

12. A transmission chain structure of claim 2, wherein said part of the contact edge that joins the bottom is arranged substantially to correspond to the external shape of the pin which during said contact provides the transmission contact therewith.

13. A transmission chain structure of claim 5, wherein said contact edge is arranged to be convex within the part thereof that joins said bearing surface whereupon the center of curvature of said part is substantially the center of the hold of said closest articulation which precedes said part in the direction of the motion.

14. A transmission chain structure of claim 6, wherein the parts forming the surface of said contact edge are composed of at least the first radius of curvature, whereupon the center of curvature of said part of the contact edge, which joins said bearing surface, is substantially the center of the hold of said articulation which is closest to and precedes said part in the direction of the motion, and the second radius of curvature, whereupon the radius of curvature of that part of the contact edge, which joins said bottom, corresponds substantially to the radius of curvature of the pin which, during said contact, provides the transmission contact therewith.

15. A transmission chain structure of claim 7, wherein in the direction of motion of the chain said bottom is arranged to be substantially parallel to said center line.

16. A transmission chain structure of claim 9 wherein said back edge in the opening of the form piece is arranged into connection with said solid extension and wherein it forms at least part of the trailing edge.

* * * * *